United States Patent [19]

Hsieh

[11] Patent Number: 5,648,001
[45] Date of Patent: Jul. 15, 1997

[54] WELDING METHOD AND CLAMPING DEVICE FOR STEEL REINFORCEMENTS

[76] Inventor: Shun-Cheng Hsieh, No. 14, Lane 145, Hwa-Shing St., Taichung City, Taiwan

[21] Appl. No.: 606,020

[22] Filed: Sep. 29, 1995

[51] Int. Cl.$^6$ .................................................. B23K 25/00
[52] U.S. Cl. .......................... 219/61; 219/60 R; 219/73.1
[58] Field of Search ............................. 219/137 R, 59.1, 219/60 R, 61, 73.1

[56] References Cited

U.S. PATENT DOCUMENTS

| | | | |
|---|---|---|---|
| 2,279,044 | 4/1942 | Heist | 219/137 R |
| 4,129,771 | 12/1978 | Pinettes et al. | 219/137 R |
| 4,321,448 | 3/1982 | Shiozawa et al. | 219/73.1 |

FOREIGN PATENT DOCUMENTS 42-18744  9/1966  Japan ................... 219/60 R

*Primary Examiner*—Clifford C. Shaw
*Attorney, Agent, or Firm*—Pro-Techtor International

[57] ABSTRACT

A welding method for steel reinforcements, wherein electric current flows through the reinforcements, an electroslag pool formed from a solder melted by an electric arc generates a lot of heat to melt the reinforcements, pressure is applied to combine the same; the method uses a clamping device, wherein a sliding chuck is adjustably rotated by means of a bolt handle thereon to enhance a movable clamping seat to clamp the upper reinforcement, then a fixed chuck is adjustably rotated by means of another bolt handle to enhance another movable clamping seat to clamp the lower reinforcement, a crank provided at one side of a main body can be optionally rotated forwardly or backwardly to raise or lower the upper reinforcement, or the upper and the lower reinforcements can be compressed for combining.

6 Claims, 6 Drawing Sheets

WELDING METHOD AND CLAMPING DEVICE FOR STEEL REINFORCEMENTS

BACKGROUND OF THE INVENTION

1. Field of the Invention

The present invention relates to a welding method and a clamping device for steel reinforcements, and especially to the welding method and clamping device for integratedly connecting steel reinforcements.

2. Description of the Prior Art

Traditional ways of connecting steel reinforcements in constructing include mainly bind welding, interweave welding or bind weldrod welding, steel reinforcements in such ways of connecting are lapped, there is much waste of reinforcements and cost,.yet bearing ability of reinforcements is inferior; moreover, binding or welding in such ways of connecting needs highly qualified persons to operate, an ordinary person is impossible to do the same work, in this way, workman cost is so high as to be a suffering burden to an owner of such businesses.

In view of this, the inventor of the present invention provides the welding method and clamping device for steel reinforcements after long term study as well as designing.

SUMMARY OF THE INVENTION

Therefore, the main object of the present invention is to provide a welding method for steel reinforcements such method can be operated with fast speed, short time, simple procedure, high convenience and efficiency and also reduces cost.

Another object of the present invention is to provide a clamping device for steel reinforcements for executing welding of steel reinforcements in a convenient and smooth way.

The present invention will be apparent in its objects technical measures and effects after reading the detailed description of the preferred embodiment thereof in reference to the accompanying drawings.

DETAILED DESCRIPTION OF THE PREFERRED EMBODIMENT

Figure 1:
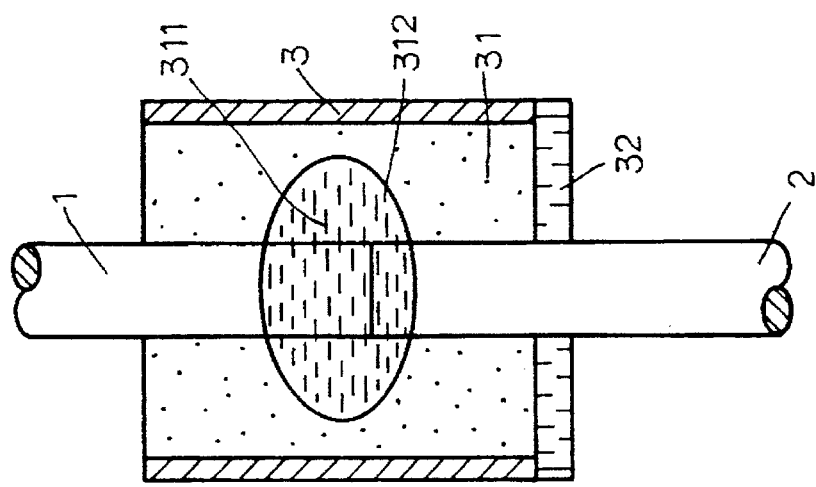
FIG. 1 is a schematic view of an embodiment of the present invention, showing its process of electric arc striking.

The present invention is now described referring to the drawings regarding the steps of its welding method for the steel reinforcements:

a) Arc striking process: as shown in FIG. 1, an upper and a lower steel reinforcements 1, 2 are kept in alignment with each other by their axes, a solder tank 3 is provided at the connection of the upper and the lower steel reinforcements 1, 2, the solder tank 3 is full filled with solder 31, then the steel reinforcements 1, 2 are connected to an electric power source, and the upper steel reinforcement 1 is lifted up to strike an electric arc 4 between the upper and lower steel reinforcements 1, 2 under a strong electric current.

The connection mode to the above mentioned electric power source is like this: the upper steel reinforcement 1 is connected to an electrode of the power source, while the steel reinforcement 2 is connected to the other electrode thereof.

Principal gredients of the solder 31 include:

| (1) MnO | 3.4–38.0% |
| (2) $SiO_2$ | 40.0–44.00% |
| (3) MgO | 5–8% |

The solder 31 is in the form of red brown glassic grains having graininess of 8–40 meshes.

Figure 2:
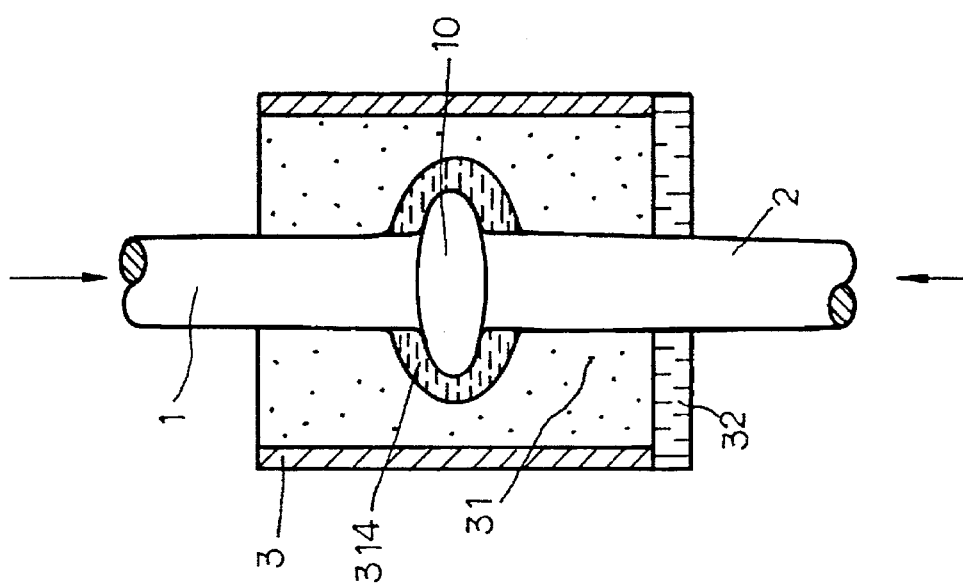
FIG. 2 is a schematic view of the embodiment of FIG. 1, showing its process of arcing.

An asbestos cloth or some other refractory material 32 is wrapped over or provided at the bottom of the solder tank 3 before it is filled with the solder 31, so that the latter is not to fall.

b) Arcing process: as shown in FIG. 2, high temperature generated after striking of the electric arc 4 will melt the solder 31 placed near the arcing region, and an electroslag pool 311 will be formed, part of the solder 31 in the electroslag pool 311 will be evaporated under high temperature, the pressure in the vapor will generate a gas arc cavity 312 near the arcing region, while the surrounding of the gas arc cavity 312 is adjacent to the layer of the molten elastic solder 313, the electric arc 4 can steadily burn in the gas arc cavity 312 by the action of gas electrolizing.

Function of the above mentioned arcing process is to generated high temperature to burn flat the ends of the steel reinforcements 1, 2 and to melt the solder 31 in the arcing region and form the electroslag pool 311 and the gas arc cavity 312.

Besides, function of the solder 31 is to raise the heat efficiency of the electric arc 4, and to chemically reduce the metal on the ends of the molten steel reinforcements 1, 2; yet the molten iron will not flow down by upholding action of the solder 31.

Figure 3:
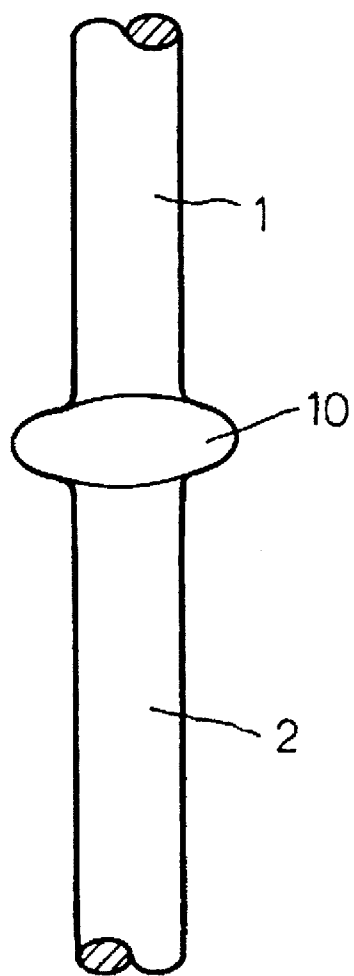
FIG. 3 is a schematic view of the embodiment of FIG. 1, showing its process of electroslag processing.
Figure 5:
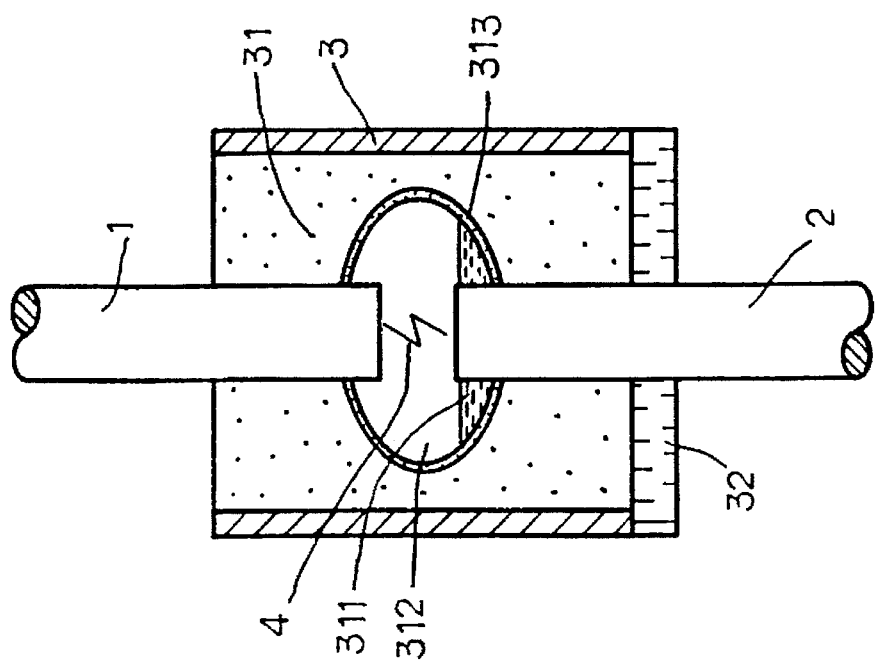
FIG. 5 is a schematic view of the embodiment of FIG. 1, showing its connection of the steel reinforcements after welding.
Figure 4:
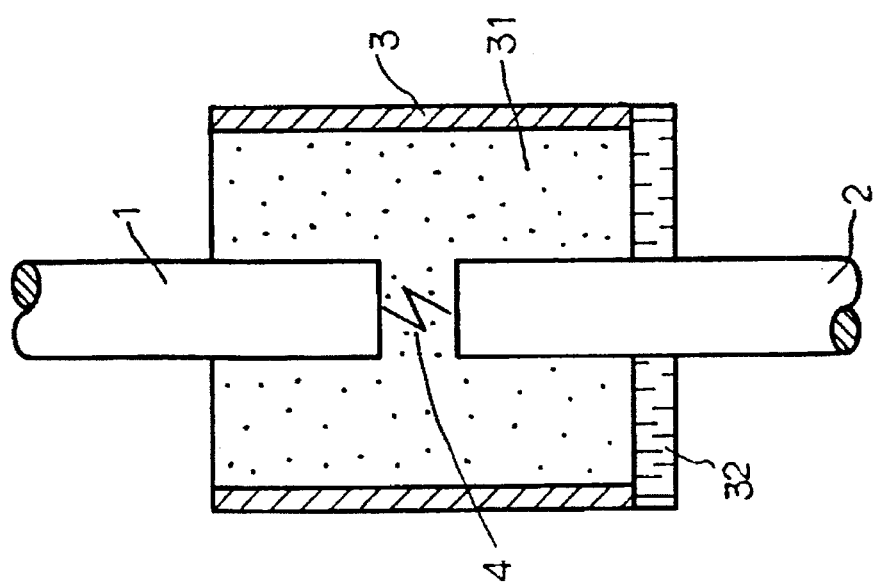
FIG. 4 is a schematic view of the embodiment of FIG. 1, showing its process of compressing.

Further, by function of the gas arc cavity 312, the electric arc 4 can steadily burn therein.

c) Electroslag processing: as shown in FIG. 3, after completion of the above stated processes, the arc gas cavity 312 has formed an electroslag pool 311 of predetermined depth, now the front end of the upper steel reinforcement 1 is placed in the electroslag pool 311, and after the electric arc 4 is extinguished, the electroslag pool 311 in a molten state can still be electrically conductive, hence the welding loop remains to have electric current therein, the current will generate high temperature when it flows through the resistence of the electroslag pool 311, and temperature in the electroslag pool 311 can be maintained around 2000° C., meantime, the ends of the steel reinforcements 1, 2 are all uniformly heated in the electroslag pool 311 and continue to be molten, the front ends of the steel reinforcements 1, 2 are all uniformly burned flat by the electric arc 4, the front ends can therefore form a transitional layer of liquid state which is going toward solid state.

d) Compressing process: as shown in FIG. 4, after completion of the above stated processes, a suitable pressure is applied onto the upper and lower steel reinforcements 1, 2 to render the ends thereof to be pressed to form a welding connection 10, meantime, impurities such as molten iron slag and oxides are extruded out of the connection to connect integratedly the upper and lower steel reinforcements 1, 2, such as shown in FIG. 5, to thereby ensure the structural strenth of the welding connection 10.

Concerning the compressing signals as well as compressing time for the above stated compressing process, the welding time is set by a control circuit, while the compressing signals such as sounds or illumination emitted by the control circuit indicate it is the welding time for the operator to start the compressing step, and when the set compressing time is up, the control circuit will be turned off, and the whole welding process is completed.

Figure 8:
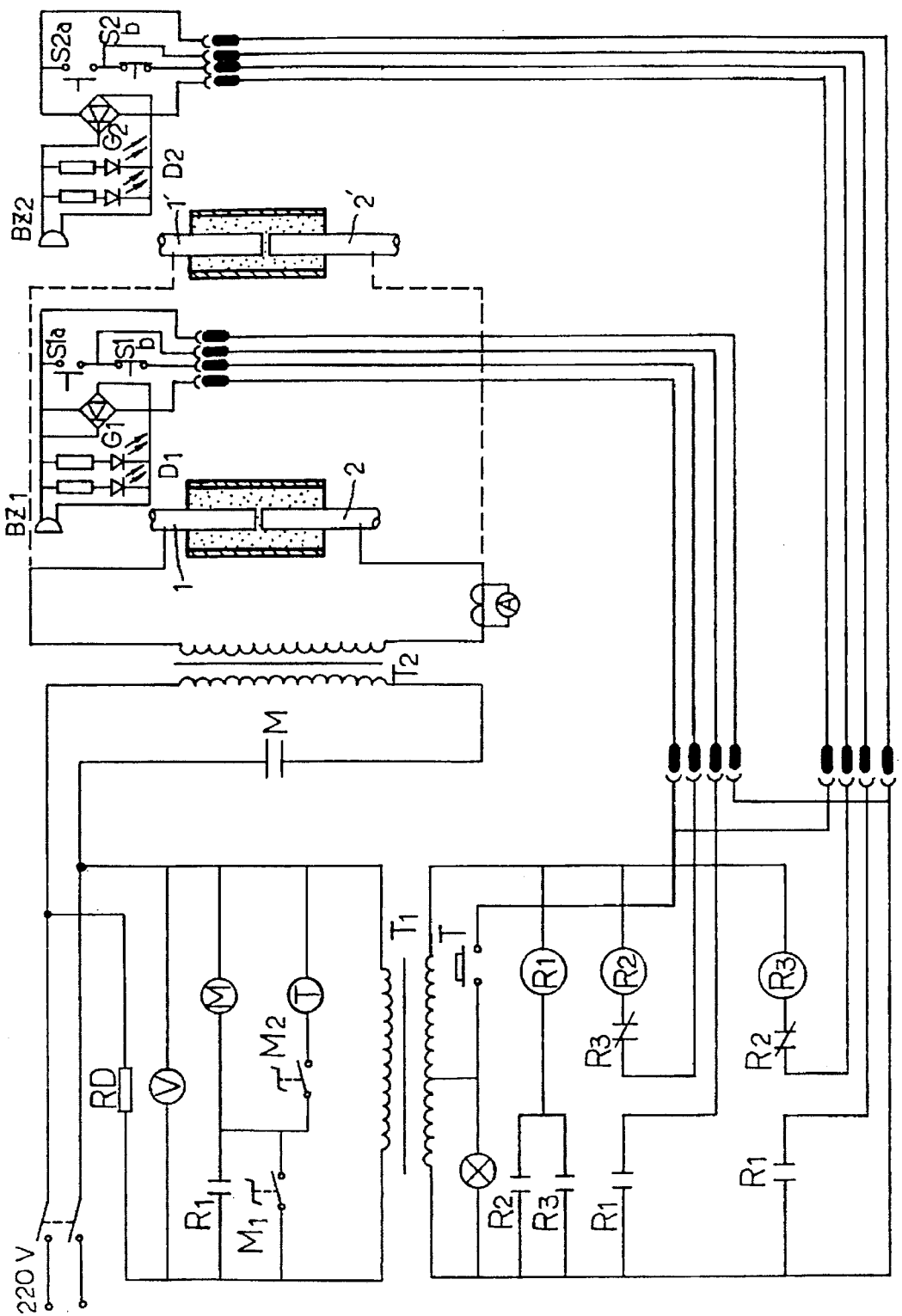
FIG. 8 is a control circuit diagram of the embodiment of the present invention.

FIG. 8 shows the control circuit of the present invention, the components thereof are as follows:

RD: NO-FUSE BREAKER, Ⓥ: VOLTAGE GAUGE,

Ⓧ: INDICATING LAMP, Ⓜ: ELECTROMAGNETIC SWITCH,

M: NORMALLY OPENED CONNECTION OF THE ELECTROMAGNETIC SWITCH Ⓜ,

R1: RELAY, R2: RELAY, R3: RELAY,

Ⓣ: TIMING SWITCH, T1: CONTROL TRANSFORMER,

T2: WELDING TRANSFORMER, ⓐ: ELECTRIC CURRENT

MUTUAL INDUCTANCE, BZ1, BZ2: BUZZERS,

D1, D2: LIGHT EMITTING DIODES,

G1, G2: BRIDGE TYPE RECTIFYING CIRCUITS,

M1, M2: FUNCTIONALITY CONVERSION SWITCHES,

S1a: NORMALLY OPENED CONNECTION OF PUSH BUTTON,

S1b: NORMALLY CLOSED CONNECTION OF PUSH BUTTON,

S2a: NORMALLY OPENED CONNECTION OF PUSH BUTTON,

S2b: NORMALLY CLOSED CONNECTION OF PUSH BUTTON,

Referring now to the circuit diagram of FIG. 8, the function and operation thereof are as follows:

1. Under the normal welding situation (not the method of the present invention), a functionality conversion switch M1 is closed, voltage of 220 V will directly connect to the electric magnetic switch Ⓜ to render the later to operate, the normally opened connection M then is closed, the welding transformer is therefore turned on and operated, the welding work can be proceeded.

2. Under the welding operation of the present invention:

1) The switch M1 is in a normally opened position, push down the switch M2, the electric magnetic switch Ⓜ is in an off state.

2) When the preparing work is completed, push down the push button switch S1a (or S2a), the relay R2 (or R3) is turned on for operation, this in turn renders the relay R1 to be activated, now release the normally opened connection of the push button switch S1a (or S2a), the control circuit will automatically locked (self-maintaining), i.e., the nomally opened connections of the relays R2 ,R1 (or R3 ,R1) will be closed, the electric magnetic switch Ⓜ and the timing switch Ⓣ can be turned on and activated, the welding transformer then is turned on, and the welding process of the present invention is now started, after a predetermined time period, the normally opened connection of the timing switch Ⓣ is closed, so that the buzzer BZ1 (or BZ2) and the lighty emitting diode D1 (or D2) are activated, then a sound, an optical signal are emitted to tell that it is the welding time, at this moment, the steel reinforcements 1, 2 are under compressing process and push down the normally closed connection of the push button switch S1b (or S2b), and the relay R2 (or R3) is turned off, then the relay R1 is in turn turned off, the same is the electric magnetic switch Ⓜ, the welding transformer then stops operating.

3) After the normally opened connection of the push button switch S1a (or S2a) is pushed down, if now the other normally opened connection of the push button switch S2a (or S1a) is also pushed down, the control system will not be in operation, this forms a protection by mutual locking to avoid over loading of the welding transformer T2.

4) Two set of welding connections are used in the present invention, wherein two control circuit portions are alternatively utilized, i.e., when one of the welding connection sets completes its welding, the other set is ready for welding process, this alternative utilization can increase working effect.

Moreover, after compressing process, the welding connections are kept in the solder for a few minutes, and then the solder tank is removed to spill the unmelted solder, after complete cooling down of the welding connections, a slag shell 314 is knocked away, and the whole operation is completed.

Time for practising such welding method is 20–40 seconds, efficiency thereof is over fivefold higher than the prior arts (bind welding, interweave welding or bind weldrod welding). In the present invention, a clamping device is necessary for clamping steel reinforcements so that welding of the present invention can be performed.

Figure 6:
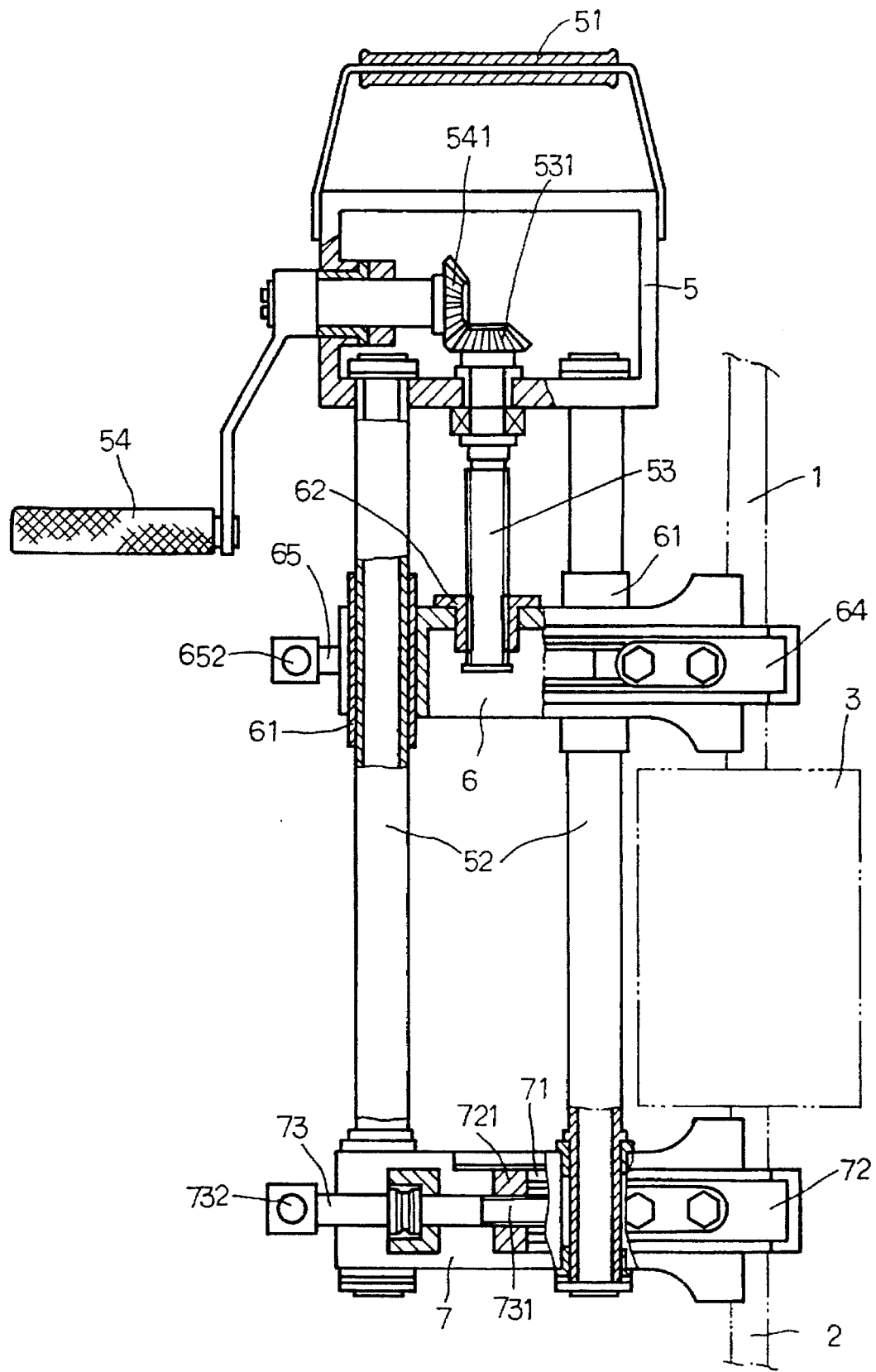
FIG. 6 is a front view of the embodiment of the present invention, showing its clamping device for steel reinforcements.

The clamping device for connecting steel reinforcements by welding of the present invention (as shown in FIG. 6) comprises mainly: a main body 5 which is provided with a handle 51 on the top end thereof, and with two bars 52 functioning as a track extending at the lower portion thereof, a bolt 53 is appropriately provided equidistantly between the two bars 52, the bolt 53 has a driven bevel gear 531 in the interior of the main body 5, the main body 5 has a crank 54 provided appropriately at one side thereof, the crank 54 has a driving bevel gear 541 in the interior of the main body 5, the driving bevel gear 541 engages with the driven bevel gear 531 for rotation by gear transmission.

Figure 7:
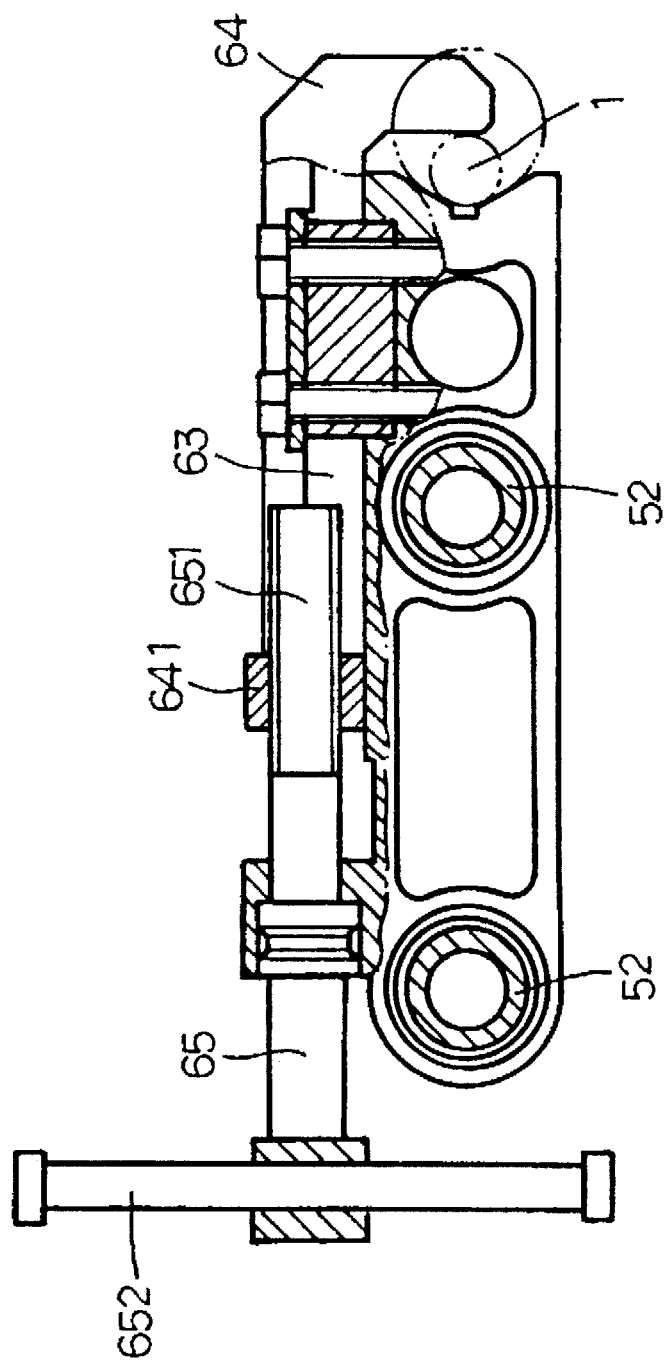
FIG. 7 is a side sectional view of the embodiment of FIG. 6, showing a chuck of the clamping device.

Further, there is a sliding chuck 6 provided between the two bars 52, whereas the sliding chuck 6 can slide on the two bars 52 by means of two sliding sleeves 61, in the middle of the sliding chuck 6 there is provided appropriately a sleeve nut 62 which can be threadedly engaged with the bolt 53 of the main body 5. When the bolt 53 is rotated, the sleeve nut 62 can move upwardly and downwardly, yet there is a sliding channel 63 on the upper end of and a movable clamping seat 64 at the front end of the sliding chuck 6, the movable clamping seat 64 is received in the sliding channel 63 by means of a threaded block 641 provided at the rear thereof (such as shown in FIG. 7), the sliding chuck 6 further has at the rear of the sliding channel 63 a bolt 65 functioning as a handle which has a threaded section 651 at the front end thereof for engaging with the threaded block 641 of the movable clamping seat 64. When the bolt handle 65 rotates forwardly or backwardly by means of a hand controlled lever 652, the threaded block 641 will render the movable clamping seat 64 to clamp or release the reinforcements. Wherein the chuck 6 can suit steel reinforcements of various sizes.

Besides, as shown in FIG. 6, a fixed chuck 7 is provided at the lower end of the two bars 52 of the main body 5, while a sliding channel 71 is provided at the upper end of the fixed chuck 7, whereon and on the front end thereof, another movable clamping seat 72 is provided. The movable clamping seat 72 is received in the sliding channel 71 by means of a threaded block 721 provided at the rear thereof, the fixed chuck 7 further has at the rear of the sliding channel 71 a bolt 73 functioning as a handle which has a threaded section 731 at the front end thereof for engaging with the When the bolt handle 73 rotates forwardly or backwardly by means of a hand controlled lever 732, the threaded block 721 will render the movable clamping seat 72 to clamp or release the steel reinforcements. threaded block 721 of the movable clamping seat 72.

With the above stated clamping device, the sliding chuck 6 is rotated for adjusting by means of the bolt handle 65 to enhance the movable clamping seat 64 to clamp the upper steel reinforcement 1; then the fixed chuck 7 is rotated for adjusting by means of the bolt handle 73 to enhance the movable clamping seat 72 to clamp the lower steel reinforcement 2; whereby, in the welding process of the steel reinforcements, the crank 54 provided at one side of the main body 5 can be optionally rotated forwardly or backwardly to make the driving bevel gear 541 drive the driven bevel gear 531 for rotation by gear transmission, meanwhile, the bolt 53 rotates and in turn drives the sliding chuck 6 to move upwardly and downwardly, the upper steel reinforcement 1 can thereby be raised in the process of arc striking or lowered into the electroslag pool in the process of electroslag processing, or the upper and the lower steel reinforcements 1, 2 are compressed for combination in the process of compressing etc.

In conclusion, we can have the advantages of the present invention as listed below:

1) Welding time is short, circa 20–40 seconds.

2) Efficiency is high, it is over fivefold higher than that of a traditional practising.

3) Cost is low, it is $1/3$–$1/8$ of the traditional method.

4) The whole welding process can be proceeded without arc lecht, fly ash, smoke or dust, the working environment is excellent.

5) Operation is convenient, and is simple for learning, requirement of skill to workmen is lowered.

6) Processing is expedient and very quick.

Although this invention has been disclosed and illustrated with reference to particular embodiments, the principles involved are susceptible for use in numerous other embodiments which will be apparent to persons skilled in the art.

The invention is, therefore, to be limited only as indicated by the scope of the appended claims:

1. A welding method for steel reinforcements comprising the following steps:

a. an arc striking process wherein an upper steel reinforcement and a lower steel reinforcement are placed adjacent to each other, a solder tank filled with solder is provided at a connection of said upper steel reinforcement and said lower steel reinforcement, said upper steel reinforcement and said lower steel reinforcement are connected to an electric power source, said upper steel reinforcement then being raised to create an electric arc between said upper steel reinforcement and said lower steel reinforcement;

b. an arcing process wherein said electric arc melts solder from said solder tank near an arcing region, thereby forming an electroslag pool, and wherein evaporation of a part of said solder in said electroslag pool will create vapor pressure, thereby forming a gas arc cavity near said arcing region, gas electrolysis in said gas arc cavity sustaining said electric arc;

c. an electroslag process wherein an end of said upper steel reinforcement and an end of said lower steel reinforcement are placed in said electroslag pool, said electric arc is extinguished, said electroslag pool is electrically conductive and continues to conduct electric current, thereby maintaining a welding loop to maintain a temperature of said electroslag pool at approximately 2000° C., said ends of said steel reinforcements form a transitional layer;

d. a compressing process wherein pressure is applied to said ends of said steel reinforcements to form a welding connection while impurities are extruded from said connection to ensure structural strength of said connection.

2. The welding method for steel reinforcements as claimed in claim 1 wherein:

said welding connection is formed via connection of an electrode of said power source to said upper steel reinforcement, said lower steel reinforcement being connected to a grounding electrode of said power supply.

3. The welding method for steel reinforcements as claimed in claim 1 wherein:

said solder comprises MnO, 3.4–38.0%; $SiO_2$, 40.0–44.0%; and MgO, 5–8%.

4. The welding method for steel reinforcements as claimed in claim 1 wherein:

a refractory material is placed at a bottom of said solder tank before said solder tank is filled with solder.

5. A clamping device used in welding comprising:

a main body with two bars forming a track extending from a lower portion of said main body;

a first bolt mounted between said two bars, said bolt is raised and lowered by means of a crank in communication with said bolt by means of bevel gears;

a sliding chuck is slidably mounted on said two bars by means of two sliding sleeves, said sliding chuck includes in a central portion thereof a sleeve nut that engages via threads said bolt, a first sliding channel on said sliding chuck receives a first movable clamping seat, said first movable clamping seat includes a first threaded handle to control positioning of said first clamping seat;

a fixed chuck is mounted at a lower end of said two bars, a second sliding channel on said fixed chuck receives a second movable clamping seat, said second movable clamping seat includes a second threaded handle to control positioning of said second clamping seat; wherein said fixed chuck receives a first member to be welded, said sliding chuck receives a second member to be welded, said clamping seats are movable to adjust to the size of the members, said sliding chuck is movable in the vertical plane to provide accurate positioning of said members for a welding process.

6. The clamping device as claimed in claim 5 wherein:

said main body includes a handle to facilitate transport of said device.

* * * * *